United States Patent [19]
Campolong

[11] 3,895,930
[45] July 22, 1975

[54] VORTEX SEPARATOR
[75] Inventor: Joseph Campolong, St. Petersburg, Fla.
[73] Assignee: Pall Corporation, Glen Cove, N.Y.
[22] Filed: May 15, 1973
[21] Appl. No.: 360,516

Related U.S. Application Data
[63] Continuation-in-part of Ser. No. 306,119, Nov. 13, 1972, abandoned, which is a continuation of Ser. No. 31,471, April 24, 1970, abandoned.

[52] U.S. Cl. .................... 55/394; 55/399; 55/423; 55/426; 55/457
[51] Int. Cl. ........................................... B01d 45/16
[58] Field of Search ............. 55/210, 212, 218, 338, 55/306, 392–399, 423–427, 431, 435, 448–451, 456–457, 462; 60/39.09

[56] References Cited
UNITED STATES PATENTS
1,931,193  10/1933  Hawley .................................. 55/396
1,955,465  4/1934   Lissman ................................. 55/396
3,148,043  9/1964   Richardson et al. ................... 55/306
3,337,857  3/1968   Hutchins ............................... 55/396
3,360,909  1/1968   Barnerias ........................... 55/395 X
3,362,155  1/1968   Driscoll ........................... 55/306 UX
3,421,296  1/1969   Beurer ................................... 55/306
3,444,672  5/1969   Alsobrooks ............................ 55/306

FOREIGN PATENTS OR APPLICATIONS
192,385  10/1957  Austria .................................. 55/396

Primary Examiner—Frank W. Lutter
Assistant Examiner—David L. Lacey

[57] ABSTRACT

A vortex separator is provided having an annular contaminant chamber for receiving centrifugally separated particles, and a baffle at the entry to or in the annular chamber, to inhibit the whirling of particles retained therein either in the absence of scavenge flow or because they are unable to escape from the chamber, to prevent abrasion of the walls by the spinning particles, while not interfering with the entry of the particles into the annular chamber, nor with normal scavenge flow, if any.

10 Claims, 7 Drawing Figures

VORTEX SEPARATOR

This application is a continuation-in-part of Ser. No. 306,119 filed Nov. 13, 1972, which in turn is a continuation of Ser. No. 31,471 filed Apr. 24, 1970, both now abandoned.

Vortex separators comprise a tube through which particleladen air is passed, and a vaned deflector disposed within the tube in the path of the influent air stream to impart a helically spinning or cyclonic movement to the air stream. The air-entrained dirt particles that are relatively heavy are thrown to the periphery of the tube, due to the centrifugal force of the vortex stream, thus cleaning the air of particles at the center of the tube. The clean air at the center is normally drawn off from the center of the tube, and the peripherally-disposed dirt particles drawn off from or collected at the periphery of the tube.

In such vortex separators, the clean air outlet is in the form of a tube of lesser diameter corresponding to the central clean air zone, and coaxial with and extending into the larger diameter vortex tube. The peripheral vortex flow with the entrained particles enters an annular passage open at each end and surrounding the clean air outlet tube, and the particles are normally drawn off from the end of this by bleed or scavenge flow. It is, however, necessary to maintain flow through the annular passage, to prevent it being clogged by contaminants deposited there, and ensure that the contaminants are carried off by the flow.

Brandt Austrian Pat. No. 192,385 describes one way to overcome this problem. Brandt uses a vortex separator of conventional type, having a tubular outlet member tapping the clean air flow in the center of the vortex, in which the helical flow of the gases in the vortex is utilized to maintain the contaminants entrained in the gas in the annular passage surrounding the outlet member. The end walls of the annular passage are provided with a helix or spiral whose pitch conforms to the vortex of the contaminant-bearing gases, so as to maintain spiralling flow through the passage. To achieve this, the helix or spiral is placed midway between the ends of the annular passage. The openings at each end of the passage are unobstructed, so that the spiralling flow keeps the openings free of contaminant deposits at all times, as well as keeping the annular passage free of such deposits.

The efficiency of a vortex separator (i.e., the percentage of entrained particles that are separated) is a function of the centrifugal forces developed, the length of the spinning zone, and the proportion of the scavenge flow to clean air flow. Of course, an optimum clean air flow is always the primary desideratum. Therefore, the flow of scavenge air should be controlled at the minimum to give effective particle separation.

The measures required to control and limit scavenge flow create problems which heretofore have not been resolved when operation at superatmospheric pressure is desired. When a vortex separator is operated at a high superatmospheric pressure, as for example when cleaning bleed air taken from the compressor of a gas turbine or jet engine, one way of limiting scavenge flow is to close off all or most of the outlet end of the annular passage to form an annular contaminant chamber and to exhaust the scavenge flow therefrom through a relatively small diameter opening, disposed in the side wall or at the closed bottom or end of the chamber. The flow rate of the scavenge air through this opening and the back pressure should be sufficient to give the needed efficiency of the separator. Control over the scavenge air flow rate and pressure is maintained by selection of the diameter of the scavenge air opening, or by providing an orifice at the scavenge air opening or by providing an adjustable valve in the scavenge air opening. Where the supply of air is limited it may be desirable not to bleed a portion as scavenge flow. In such cases a scavenge air opening may either not be provided or be kept closed and the separated particles retained within the annular contaminant chamber.

If a scavenge opening is not provided, is closed or becomes plugged, as by a particle too large to pass through, the particles that are thrown centrifugally into the peripheral cyclonic flow continue to enter the annular chamber, are retained there, and are subjected to a continued cyclonic or spinning flow. However, since they cannot escape from the chamber, they continue to whirl therein, and abrade the walls of the vortex tube within the annulus. This creates a serious problem. Even while scavenge flow continues particles too large to pass through the scavenge air opening may whirl around the annular passage continuously, also resulting in abrasion. Eventually, the abrasion caused by the spinning particles will wear away the wall of the vortex tube, and cause the tube to fail.

Such a failure, depending upon the system in which the vortex separator is utilized, can be catastrophic, and therefore must be provided. For example, high pressure bleed air from the compressor is often employed in gas turbine or jet engines, to maintain the oil in the bearing housing in contact with the bearings. The need for providing clean air is of course obvious, inasmuch as contaminant particles in contact with the bearings can cause excessive wear and are quite dangerous. A vortex separator inserted in the high pressure air line would be a useful device to provide clean air. However, a failure in the vortex separator in the line leading to the bearings can cause loss of pressurization, resulting in separation of the oil from the bearings, thus causing the bearings to overheat, and possibly cause a fire. If the engine is in use on an aircraft at the time of such a failure, it can cause loss of the aircraft. Therefore, a vortex separator cannot be put to such a use unless this abrasion problem is overcome.

Another difficulty presented when there is lack of scavenge flow is that the particles which build up within the annular chamber may be swept out the open entrance, sometimes suddenly, and en masse, by the entering cyclonic flow, and then enter the clean air stream. This, of course, can be quite detrimental to downstream components in the system, and if the particles do so en masse the effect can be worse than if the vortex separator merely became inoperative.

In accordance with the present invention such difficulties are overcome by providing a vortex separator having an annular contaminant chamber and a baffle at the entry to the chamber or in the chamber, effective in the absence of scavenge exhaust flow to inhibit the whirling of particles retained in the annular chamber, while not interfering with the entry of such particles into the chamber, or their exhaust therefrom if possible, under normal conditions. The baffle may also, according to its design, inhibit the whirling of particles in the passing during normal scavenge flow, but this is an optional feature and not essential. As another feature, the baffle may also be designed as a closure to prevent the retained particles which build up within the chamber from being swept out into the clean air stream by the cyclonic flow in the vortex tube.

The vortex separator of the invention comprises a tubular body having an inlet at one end, an outlet at the opposite end, and a central passage therebetween; a deflector coaxially mounted in the passage adjacent the inlet, and having a plurality of helical vanes abutting the wall of the passage, and positioned at an angle to the line of flow from the inlet to the outlet so as to create a vortex stream in the influent air, which concentrates the contaminant particles in the whirling air stream at the periphery of the passage, thereby leaving the air at the center of the passage relatively clean; a generally tubular outlet member disposed within the central passage at the outlet end of the tubular body for delivery of clean air from the central passage of the tubular body; said tubular outlet member defining an annular contaminant chamber between the exterior of the outlet member and the interior wall of the central passage of the tubular body for receiving separated contaminant particles; a wall extending between the tubular outlet member and the tubular body at the end of the annular chamber at the outlet end of the tubular body, closing off the annular chamber at that end; and a baffle having at least one opening and defining an inlet into the annular chamber and disposed in the line of cyclonic flow at or in the annular chamber and effective at least when scavenge flow ceases and, optionally, also while scavenge flow continues, to deflect the whirling air stream in a manner to inhibit the whirling movement of the particles retained in the chamber, and thus prevent abrasion of the wall of the tubular body there, substantially without interfering with the entry of particles into the chamber or with normal scavenge flow, the opening having a larger available open area than any outlet port from the annular chamber. Preferably, the annular chamber has at least one port for scavenge flow from the chamber, controlling scavenge flow. Such control can be achieved by adjusting the size of the port, or by orifice means or valve means in fluid flow connection with the port. The outlet port has a lesser open area available for flow than the inlet or inlets to the annular chamber at the baffle.

Preferred embodiments of the vortex separator of this invention are illustrated in the drawings, in which.

Figure 1:
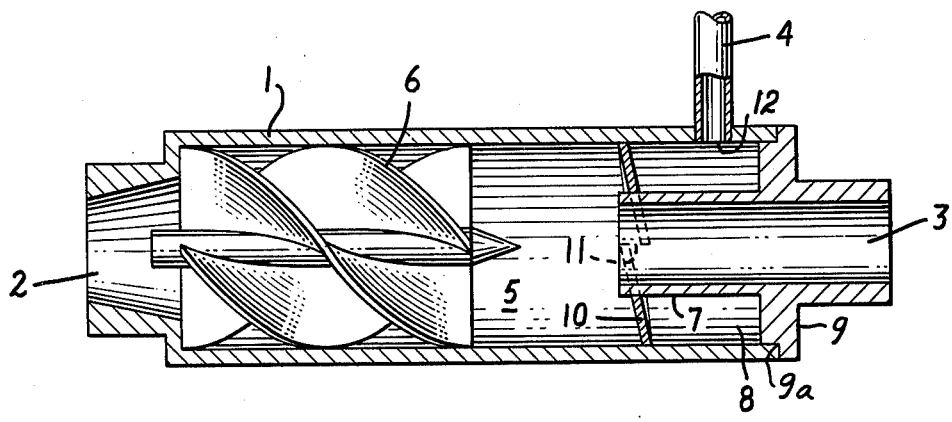
FIG. 1 is a cross-sectional view of a vortex separator having a baffle in the form of a helical ring which is effective only in the absence of scavenge flow.

The baffle can be of any construction that obstructs whirling movement in the annular chamber when scavenge flow ceases, and optionally also while scavenge flow continues, without substantially interfering with scavenge flow to and out of the annular chamber. The baffle must therefore provide an entrance into the chamber for scavenge flow, if any, and contaminant particles. Where provision is made for scavenge exhaust flow the entrance should be larger than the smallest flow opening in the scavenge flow outlet.

It is particularly important that the baffle not unduly obstruct or interfere with scavenge flow, where an exhaust is provided, since the entrained particles that can be carried out from the vortex separator should remain entrained thereby. Any particles too large to pass through the outlet and therefore retained in the chamber should be quiescent, on the other hand, so that they will not cause abrasion damage.

The baffle can take a form such that it separates the spinning velocity and longitudinal velocity components of air and/or particles entering the annular chamber so that spinning particles can pass freely. The baffle can also permit spinning flow to enter the annular passage, and also block or inhibit whirling of the retained particles, or it can redirect spinning flow so that it becomes direct flow.

An example of the first-mentioned form of baffle is a flat ring closing off the annular chamber at the entrance thereto or a short distance therewithin. The ring has one or more apertures through which all flow that enters the annular chamber must pass.

The size of the apertures in the ring should be large enough to permit all separated particles, whatever their size, to enter and should not diminish scavenge flow in rate or volume, so that most of the air-entrained particles that can escape remain entrained, and escape through the outlet, if one is provided. A flat ring of this type is effective when scavenge flow ceases, due to a blockage or otherwise, by permitting the entry of particles through the aperture only in a direct path. The whirling air at the periphery of the vortex tube has little tendency to pass through the baffle into the chamber when there is no scavenge flow. Therefore, once within the chamber the centrifugal forces of the cyclonic flow no longer act upon the particles, so that they may harmlessly settle out within the chamber. In addition, during normal scavenge flow conditions spinning or whirling flow is usually inhibited from entering, and only direct flow is possible. As a practical matter, the air in the annular chamber beyond the ring is relatively quiescent, and particles entrained in the direct flow will be exhausted. Any particles that are too large to pass through the exhaust outlet or too heavy to remain entrained in the flow will remain within the annular chamber, but are quiet, and will not abrade the walls of the tubular body.

The ring should completely close the entrance to the annular chamber except for the aperture or apertures which permit the entry of scavenge flow and entrained particles. In this manner, the ring serves as a closure to retain the separated particles within the chamber in the absence of scavenge flow. As the particles build up within the chamber, the ring prevents their being swept out by the cyclonic flow in the vortex tube.

In the simplest form, the ring is a flat washer, having a single aperture through its solid portion. The outside diameter of the ring is approximately equal to the inside diameter of the tubular body, and the inside diameter of the ring is approximately equal to the outside diameter of the tubular outlet member, so that when installed it closes off the greater part of the inlet to the annular chamber. The flat ring should be disposed a short distance within the annular passage and defines the inlet end of the annular chamber. This ensures that the whirling particles which strike the ring will be held on the ring, will travel circumferentially thereon until they can reach and enter an aperture thereof, and will not be deflected into and entrained in the clean air flow prior to their passage through the aperture into the annular chamber.

The ring can also be disposed at an angle to the axis of the vortex separator. If the angle is approximately equivalent to or greater than the helix angle of the vaned deflector, one segment of the ring is parallel to the plane in which the whirling particles move, and if the aperture is located on this segment, at right angles to the plane of flow, the entrained particles will have to chamber direction by a 90° angle to pass through the aperture. Moreover, such an aperture prevents entry of the cyclonic flow, and inhibits whirling within the annular chamber both during and in the absence of scavenge flow.

If the angle is less than the helix angle of the deflector and the aperture is on a segment of the ring which is opposed to the direction of whirling the whirling particles are in effect scopped into the aperture, while scavenge flow continues. When scavenge flow ceases or is not utilized the particles still enter readily due to their centrifugal momentum, but the cyclonic does not, and the cyclonic flow forces acting upon the particles within the chamber are thus greatly diminished by the presence of the ring, since in the absence of scavenge flow the whirling air has little tendency to pass through the aperture to enter the chamber. The ring is thereby effective to inhibit the whirling of the particles trapped within the chamber.

The aperture does not function as a restricting orifice. In order to prevent it from doing so, where scavenge flow is desired, the size of the aperture is sufficiently large and the thickness of the ring sufficiently small to permit the scavenge opening to control the scavenge flow, by whatever means at the opening is desired, such as size, an orifice, or a valve.

When the flow rate is high, it may be necessary to provide more than one aperture in the ring. When a plurality of apertures are employed, each must conform to the proper size requirements to permit the passage of the entrained particles, without restricting flow rate.

The apertures can have any convenient shape, such as round, square or rectangular. They can be formed by drilling, punching, slitting or perforating, or cutting out a segment of the ring. Preferably, arcuate shaped openings extending radially across the annular passage from the inside wall of the tubular body to the outside wall of the tubular outlet member are utilized to allow the particles easy access to the opening. An arcuate aperture can be formed simply by splitting the ring in one portion and adjusting the size of the gap by removing a radial segment.

The baffle can also take the form of a split ring, formed into a single-coil helix, resembling a lock washer, wherein the size of the aperture varies according to the pitch of the helix, and the gap between the split ends of the ring. Such a helix can have a pitch either parallel or opposed to the direction of whirling. If the aperture between the ends of the helix is such that the whirling air stream must change direction, in order to pass through the aperture, the particles will not enter readily, thus inhibiting their whirling motion in both the presence and absence of scavenge flow. If the aperture in the helical ring faces the oncoming flow in the whirling air stream, the particles enter the aperture readily in the presence of scavenge flow, but when scavenge flow ceases, although the particles continue to enter readily the baffle is effective to inhibit their whirling within the chamber. A helical baffle of this latter type is preferred where it is important to inhibit whirling only in the absence of scavenge flow, such as in a vortex separator having no scavenge exhaust outlet in which the separated particles are collected and retained within the annular chamber. While permitting the easy entry of the particles, the helix effectively prevents the particles which build up in the chamber from being swept out.

If a helical baffle in which the aperture faces the whirling air stream is used in a vortex separator employing scavenge flow to exhaust the separated particles, the pitch of the helix may be less than the pitch of the helical vaned deflector. In this manner the angular direction change required for the flow and entrained particles to pass through can be sufficient to inhibit whirling of large or heavy particles which are trapped and retained within the chamber.

The ring, whether flat or helical, can be secured within the annular passage by welding, brazing, bonding or be press fit. It may also be formed as an integral flange on the entrance end of the clean air outlet tube. Other suitable means for attaching or forming the ring will be apparent to those skilled in the art.

The baffle can also be in the form of radial fins which extend partially or completely across the annular chamber parallel to the axial flow therethrough, and either partially or completely from end to end of the annular chamber. When the whirling stream enters the annular chamber, whirling is halted by the obstructing fins, and direct axial flow results. Since the fins extend radially across the annular chamber they do not obstruct axial flow of entrained particles, nor are the entrained particles deflected into the clean air outlet. In addition, since the fins offer little resistance to scavenge flow, they have no adverse effects on the efficiency of the vortex separator.

When the fins extend partially across the annular chamber, they can be fixedly attached to either the outside wall of the clean air outlet tube or the inside wall of the separator body, or preferably both wherein they are alternately attached to the body and the outlet tube, so that a whirling stream will have a tortuous path to follow, but a direct flow has free passage. The fins should extend radially sufficiently across the annular chamber that a complete circular path is not available to the whirling flow. Similarly, the fins should extend longitudinally within the annular chamber a distance sufficient to ensure that the whirling air must make contact therewith during one revolution of the whirling air. The entrained particles also are deflected by the fins. The heavier particles and those that are too large to pass through the outlet are separated out, and remain quiescent at the bottom portion of the annular chamber, while the smaller and lighter particles are vented via the scavenge flow opening.

When the fins extend completely across the annular chamber, they can be fixedly attached to both the separator body and the clean air outlet tube, so as to form a plurality of segmented annular chambers. The whirling flow that enters the annular chambers can only flow axially therethrough, since the fins prevent the circular movement of the flow.

The fins should not block the scavenge flow outlet or outlets. In this manner, the fins do not prevent the passage of such entrained particles as can escape to the outlet.

The number of fins required to inhibit or stop the whirling of the whirling air stream is dependent upon factors, such as the angle of the fins, the diameter of the annular chamber, the flow rate, the pressure, and the spacing of the fins in the annular chamber. Three fins extending radially completely across the annular chamber and disposed approximately 120 apart are satisfactory to inhibit whirling without adversely effecting the particle separation efficiency. Such fins can extend longitudinally to the outlet end of the chamber with scavenge flow outlets provided at the outlet end of each chamber segment thus defined by the fins.

Preferably, the baffle, whether it be in the form of an apertured ring or radial fins, is formed from the same or similar material as the vortex separator, to facilitate its welding, brazing, bonding or press-fitting in place. By utilizing the same material as the separator, both will be subject to the same contraction and expansion, due to temperature changes. Since high pressure vortex separators are often used in high temperature systems, this is an important consideration. Usually, vortex separators for high pressure and temperature systems can be constructed from metallic material, such as steel, stainless steel, aluminum, nickel alloys and the like. Where temperature and pressure requirements are not extremely high, abrasion-resistant plastic materials, such as nylon, polytetrafluoroethylene, polypropylene, polycarbonate and polyphenylene oxide resins can be utilized.

The scavenge port is an opening in the side or end wall of the annular scavenge chamber. While more than one port can be provided, it is usually desirable to provide only one, since it can be larger and therefore less likely to plug with contaminant. The opening is preferably round, to reduce the likelihood of plugging, and is preferably located in the side wall of the chamber, at a distance from the outlet end of the chamber greater than the diameter of the opening. This permits large or heavy particles which are trapped and retained in the chamber to collect at the outlet end without blocking the scavenge port. If the unit is mounted with its axis horizontal, the scavenge port should preferably not be on bottom, for the same reason.

The scavenge port is preferably formed as an orifice in the outside wall of the chamber, sized to provide the desired flow at the operating pressures and temperatures. Connecting lines if provided should preferably be larger than the orifice, to avoid any possibility of plugging, and to avoid forming an inadvertent scavenge flow restriction in the line. The port can be formed in the shape of a tube, which acts as both orifice and connecting line at the same time. Alternatively, a control valve may be connected to the scavenge port. Since the flow through this valve contains contaminant particles, the valve should be designed to be unaffected by the particles present. A gate valve, preferably used with a turbine type flowmeter, is suitable and a needle valve can also be used, in low contaminant flows.

The design of the tubular body, the vaned deflector and the clean air tubular outlet member are important for the efficient operation of the vortex separator. It should be noted that the design of the baffle of the invention can be adapted to fit the design requirements of any of the other components. Therefore, the baffles can be efficiently utilized in high pressure vortex separators of varying design, and will efficiently inhibit whirling in the annular contaminant chamber thereof so as to prevent the abrading of the body tube walls by whirling particles.

The vortex separator shown in FIG. 1 comprises a tubular body 1 with an open central portion or vortex chamber 5, and formed stainless steel, and having an inlet 2 for high pressure contaminated air, and outlet 3 for clean air and a scavenge flow outlet line 4 for contaminated exhaust air. The scavenge flow outlet line 4 is in fluid flow connection with the scavenge port 12, for exit of scavenge flow from the annular chamber 8. A vaned helical deflector 6 is disposed within the center of the tubular body 1 to generate a vortex stream in the influent air which concentrates the contaminant particles in the whirling air stream at the periphery of the passage 5, thereby leaving the air at the center of the passage relatively clean. The outlet 3 has a tubular outlet member 7 which has a peripheral flange 9 extending to the wall of the tubular body 1 and terminating in a peripheral recess 9a, receiving the end of the tubular body. The outlet member 7 extends into the open central portion 5 of the tubular body 1. The tubular member 7, flange 9 and the inside walls of the tubular body 1 define an annular chamber 8 for the passage of scavenge flow and entrained particles. The flange 9 walls off the outlet end of the annular chamber 8 so that the only exit is the scavenge port 12 leading to the scavenge flow outlet line 4. The scavenge port 12 is disposed in the wall of the body 1 with its centerline at a distance from flange 9 equal to twice the diameter of the outlet. The port 12 is small, so that only contaminant particles below a certain size can pass through, but the size of the port is made small not for this reason but to restrict and control scavenge flow to an efficient level.

Figure 2:
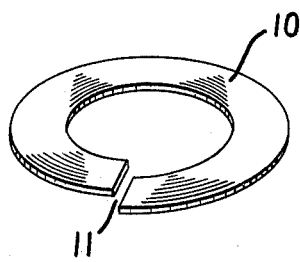
FIG. 2 is an isometric view of the helical ring baffle utilized in the vortex separator of FIG. 1.

A baffle in the form of a helical ring 10 having aperture 11 which is larger than the scavenge port 12 is disposed within the entrance to the annular chamber 8. The ring extends from the outside wall of the tubular member 7 to the inside wall of the tubular body 1, so that all air that enters the annular chamber 8 must pass through the aperture 11. As shown in FIG. 2, the ring 10 is a single coil helix resembling a lock washer. The helical ring 10 is installed just within the entrance to the annular chamber 8, and has a pitch direction the same as the vortex stream, so that the aperture 11 faces the whirling stream, and the entrained particles can freely pass therethrough with scavenge flow restricted to that accomodated by scavenge port 12.

In operation, the vaned deflector 6 generates a vortex stream in the contaminated influent air that enters via inlet 2. The vortex stream concentrates the contaminant particles in the whirling air stream at the walls of the tubular member 1, thus allowing them to enter annular chamber 8 via aperture 11 in the helical ring 10, and be discharged via the scavenge flow port 12. The clean air in the center of the vortex is tapped by outlet member 7 and is thus discharged via port 3. Whenever the scavenge flow ceases, due, say, to blockage of the port 12 by entrained particles, the helical baffle 10 is effective to inhibit the whirling movement of the particles now retained within the chamber 8. The particles continue to freely pass through the aperture 11, due to their centrifugal momentum, but once inside the chamber 8 the baffle 10 of chamber 5 prevents the particles from being subjected to the cyclonic flow forces above the outlet member 7. The whirling motion of the air at the periphery of the vortex tube does not continue past the baffle 10, due to the absence of scavenge flow while port 12 from the chamber 8 is closed. For this reason, the particles that enter the annular chamber 8 will be quiescent, and failures caused by abrasion of particles against the wall of the tubular body 1 are averted.

Even while scavenge flow continues, because of the restriction on scavenge flow imposed by the scavenge flow port 12, the whirling motion of the air is greatly restricted also, in chamber 8, beyond ring 10, and although entrained particles are carried out the port 12, the whirling abrasive movement of retained particles is greatly reduced, if not eliminated altogether, so that such particles are sufficiently quiescent to overcome the abrasion problem. It is not necessary, to eliminate the abrasion that leads to failure of the wall, to prevent all movement of particles in the chamber 8, and indeed, while scavenge flow continues, some whirling flow is needed to keep particles that can escape entrained in the flow, and carry them out the port 12.

In addition, the helical baffle 10 prevents the particles too large to pass through the port 12, and that consequently are retained in the annular chamber 8, from escaping in the reverse direction, to return to the vortex chamber 5. The baffle 10 prevents the whirling air stream in the vortex chamber 5 from sweeping the collected particles out of the annular chamber 8. This permits the particles to be stored in the chamber until it is full, at which time it can be manually cleaned out.

It is thus evident that the vortex separator of FIG. 1 is effective without a scavenge flow bleed of separated particles, i.e., when eliminating or closing the scavenge port 12. The device then performs in the same manner as when the scavenge flow outlet is blocked, as described above. The separated particles are stored within the chamber 8 and the helical baffle 10 inhibits their whirling to prevent abrasion of the chamber wall.

Figure 3:
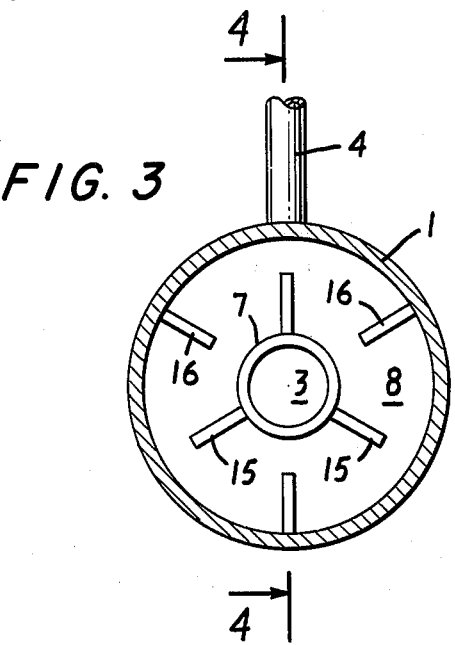
FIG. 3 is a cross-sectional view of another embodiment of baffle in the form of radial fins, which are effective both while scavenge flow continues and when it ceases.
Figure 4:
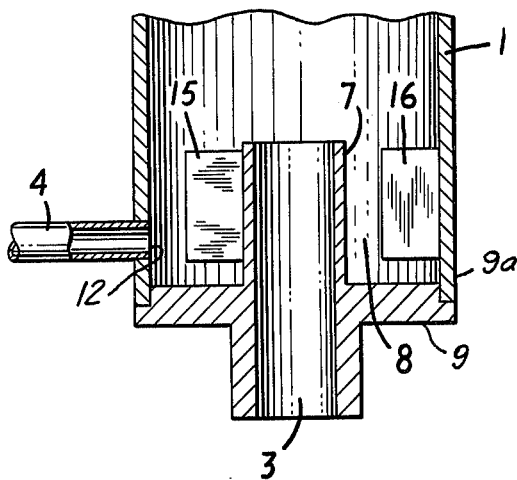
FIG. 4 is a cross-sectional view taken along the line 4—4 of FIG. 3, and looking in the direction of the arrows, showing the fins.

The baffle provided in the vortex separator shown in FIG. 3 are radial fins 15 and 16 which extend partially across the annular chamber 8, and are effective to inhibit whirling of separated particles in both the presence and absence of scavenge flow. Fins 15 are fixedly attached to the outlet tube 7 and are disposed approximately 120° apart. Fins 16 are fixedly attached to the separator body 1 approximately 120° apart, and are disposed alternately between the fins 15. Fins 15 and 16 both extend sufficiently across the annular chamber 8 in an overlapping manner so that a complete circular path is not available to the air flow within the annular chamber. As shown in FIG. 4 the fins 15 and 16 extend longitudinally within the annular chamber 8 to a point which is approximately in line with the entrance to the scavenge flow port 12. In this manner the annular chamber remains unobstructed at the outlet, and the fins do not prevent the exhaust of entrained particles. In operation, as the whirling stream enters the annular chamber it is deflected by the fins, and proceeds in an axial flow path.

Figure 5:
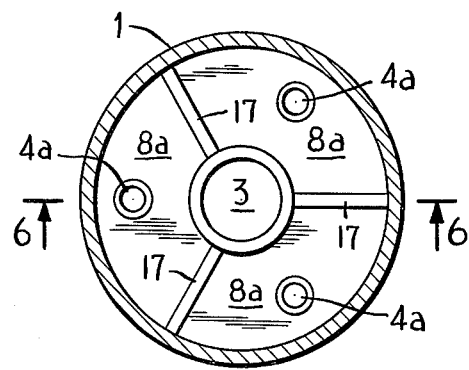
FIG. 5 is a cross-sectional view of another vortex separator having fins, and also effective both with and without scavenge flow.
Figure 6:
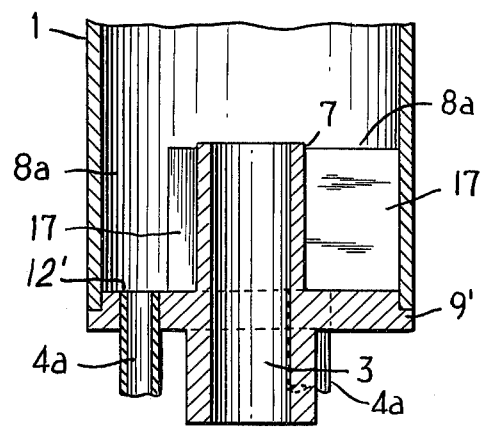
FIG. 6 is a cross-sectional view taken along the line 6—6 of FIG. 5, and looking in the direction of the arrows, showing the fins.

In the vortex separator of FIGS. 5 and 6 three radial fins 17 extend completely across the annular chamber 8, and all the way to outlet end wall 9' so as to form three segmented annular chambers 8a, closed at the outlet end, each with a scavenge flow port 12' in fluid connection with an outlet line 4a in wall 9'. Since the fins prevent circular movement of the flow, the whirling flow can only pass axially through the chambers 8a. Thus, the whirling stream is effectively dissipated, and damage to the separator body be whirling particles is prevented.

Figure 7:
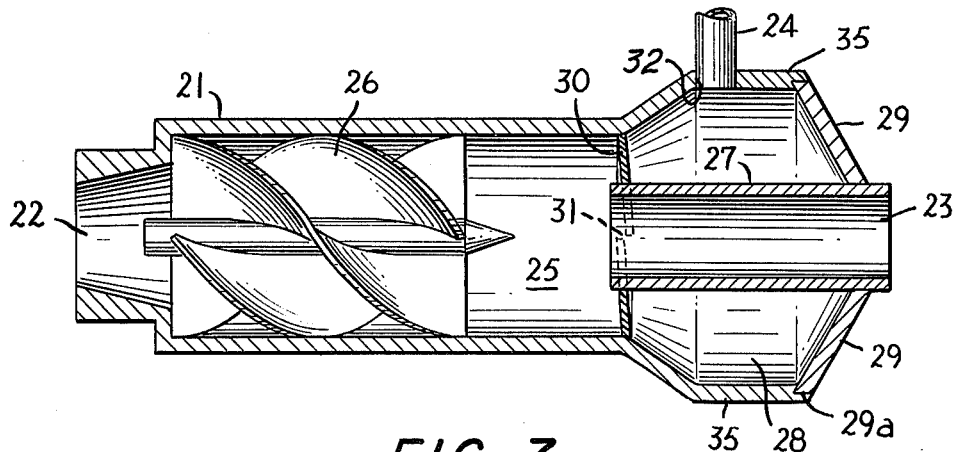
FIG. 7 is a cross-sectional view of another embodiment of vortex separator utilizing the helical baffle of FIG. 2.

The vortex separator shown in FIG. 7 comprises a tubular body 21 with an open central portion or vortex chamber 25, and formed of stainless steel, and having an inlet 22 for high pressure contaminated air, an outlet 23 for clean air and a scavenge flow outlet port 32 in fluid flow connection with the scavenge line 24 for contaminated exhaust air. A vaned helical deflector 26 is disposed within the center of the tubular body 21 to generate a vortex stream in the influent air which concentrates the contaminant particles in the whirling air stream at the periphery of the passage 25 thereby leaving the air at the center of the passage relatively clean. The body 21 has an expanded portion 35 of larger diameter at the outlet member 27 giving a large annular chamber 28, for a purpose presently to be seen.

The outlet 23 has a tubular outlet member 27 which has a peripheral flange 29 extending to the wall of the tubular body 1 and terminating in a peripheral recess 29a in the end of the tubular body. The outlet member 27 extends into the open central portion 25 of the tubular body 21. The tubular member 27, flange 29, and the inside walls of the tubular body 21 define an annular chamber 28 for the passage of scavenge flow and entrained particles. The flange 29 walls off the outlet end of the annular chamber 28, so that the only exit is the scavenge flow port 32 which is in fluid flow connection with the outlet line 24 which is disposed in the wall of the body 21. The scavenge flow port 32 and line outlet line 24 are small, so that only contaminant particles below a certain size can pass through, but the size of the port is made small not for this reason but to restrict and control scavenge flow to an efficient level.

A baffle in the form of a helical ring 30 having an aperture 31 which is larger than the port 32 is disposed within the entrance to the annular chamber 28. The ring extends from the outside wall of the tubualr member 27 to the inside wall of the tubular body 21, so that all air that enters the annular chamber 28 must pass through the aperture 31. As shown in FIG. 2, the ring 30 is a single coil helix resembling a lock washer. The helical ring 30 is installed just within the entrance to the annular chamber 28, and has a pitch direction the same as the vortex stream, so that the aperture 31 faces the whirling stream, and the entrained particles can freely pass therethrough with scavenge flow restricted to that accomodated by port 32.

In operation, the vaned deflector 26 generates a vortex stream in the contaminated influent air that enters via inlet 22. The vortex stream concentrates the contaminant particles in the whirling air stream at the walls of the tubular member 21, thus allowing them to enter annular chamber 28 via aperture 31 in the helical ring 30, and be discharged via the scavenge flow port 32. The clean air in the center of the vortex is tapped by outlet member 27 and is thus discharged via port 23. Whenever the scavenge flow ceases, due, say, to blockage of port 32 by entrained particles, the helical baffle 30 is effective to inhibit the whirling movement of the particles now retained within the chamber 28. The particles continue to freely pass through the aperture 31, due to their centrifugal momentum, but once inside the chamber 28, the baffle 30 of chamber 25 prevents the particles from being subjected to the cyclonic flow forces above the outlet member 27. The whirling motion of the air at the periphery of the vortex tube does not continue past the baffle 30, due to the absence of scavenge flow while the port 32 from the chamber 28 is closed. For this reason, the particles that enter the annular passage 28 will be quiescent, and failures caused by abrasion of particles against the wall of the tubular body 21 are averted. Even while scavenge flow continues, because of the restriction on scavenge flow imposed by the scavenge flow port 32, the whirling motion of the air is greatly restricted also, in chamber 28, beyond ring 30, and although entrained particles are carried out the port 32, the whirling abrasive movement of retained particles is greatly reduced, if not eliminated altogether, so that such particles are sufficiently quiescent to overcome the abrasion problem. It is not necessary, to eliminate the abrasion that leads to failure of the wall, to prevent all movement of particles in the chamber 28, and indeed, while scavenge flow continues, some whirling flow is needed to keep particles that can escape entrained in the flow, and carry them out the port 32.

In addition, the helical baffle 30 prevents the particles too large to pass through the port 32, and that consequently are retained, from escaping in the annular chamber 28 in the reverse direction, to return to the vortex chamber 25. The baffle 30 prevents the whirling air stream in the vortex chamber 25 from sweeping the collected particles out of the annular chamber 28. This permits the particles to be stored in the chamber until it is full, at which time it can be manually cleaned out. The widened portion 35 of the tubular body 21 enlarges the chamber 28 providing a greater storage space for such particles.

It is thus evident that the vortex separator of FIG. 7 is effective without a scavenge flow bleed of separated particles, i.e., when eliminating or closing the scavenge port 32. The device then performs in the same manner as when the scavenge flow outlet port is blocked, as described above. The separated particles are stored within the chamber 28, and the baffle 30 inhibits their whirling to prevent abrasion of the chamber wall.

Having regard to the foregoing disclosure, the following is claimed as inventive and patentable embodiments thereof:

1. A vortex particle separator with provision to prevent abrasion by separated particles retained therein, and/or exhausted therefrom by scavenge flow, comprising a tubular body having an inlet at one end, an outlet at the opposite end and a central passage therebetween; a deflector coaxially mounted in the passage adjacent the inlet, having a plurality of helical vanes abutting the wall of the passage, and positioned at an angle to the line of flow from the inlet to the outlet so as to create a vortex stream in the influent air, which concentrates the contaminant particles in the whirling stream at the periphery of the passage, thereby leaving the air at the center of the passage relatively clean; a generally tubular outlet member disposed within the central passage at the outlet end of the tubular body, for delivery of clean air from the central passage of the tubular body; said tubular outlet member defining an annular contaminant chamber between the exterior of the outlet member and the interior wall of the central passage of the tubular body receiving separated contaminant particles; an outlet port in a wall of the annular contaminant chamber for scavenge flow; a wall extending between the tubular outlet member and the tubular body at the outlet end of the annular chamber closing off the annular chamber at that end; and a baffle having at least one opening defining an inlet into the annular chamber and disposed across the entrance to the annular chamber so that the annular chamber is closed off at that end, and all flow of air and separated particles that enter the annular chamber must pass through the opening, the baffle being effective at least when scavenge flow ceases, and optionally, also while scavenge flow continues, to deflect the whirling air stream in a manner to inhibit the whirling movement of the particles retained in the chamber, and thus prevent abrasion of the wall of the tubular body there, substantially without interfering with the entry of particles into the chamber or with normal scavenge flow, the opening having a larger available open area than the outlet port from the annular chamber, so that at least some particles small enough to enter the annular chamber via the opening cannot escape from the annular chamber.

2. A vortex separator in accordance with claim 1, in which the scavenge flow port is round.

3. A vortex separator in accordance with claim 1, in which the scavenge flow port comprises orifice means in fluid flow connection with the port.

4. A vortex separator in accordance with claim 1 in which scavenge flow control is achieved by valve means in fluid flow connection with the port.

5. A vortex separator in accordance with claim 1, in which the baffle is a ring having at least one aperture in its periphery, and is effective to inhibit the whirling of separated particles within the annular chamber in the presence or absence of scavenge flow, said ring being disposed across the entrance to the annular chamber so that all flow of air and separated particles that enter the annular chamber must pass through the aperture in a direct path.

6. A vortex separator in accordance with claim 5, in which the ring is disposed a short distance within the annular chamber, so that whirling particles which contact the ring will not be deflected into the clean air flow prior to their passage through the aperture.

7. A vortex separator in accordance with claim 5, in which the aperture in the ring is a radial segment in one portion of its periphery.

8. A vortex separator in accordance with claim 1, in which the baffle is a single-coil helical ring disposed across the entrance to the annular chamber in which the gap between the ends of the coil forms an aperture.

9. A vortex separator in accordance with claim 8, in which the helical ring baffle is wound in the same direction as the helical vaned deflector, so that the aperture faces the oncoming whirling stream of air and particles, said baffle being effective only in the absence of scavenge flow to inhibit the whirling of particles within the annular chamber.

10. A vortex separator in accordance with claim 8, in which the helical ring baffle is wound in the opposite direction of the helix of the vaned deflector, so that the whirling air particles must change direction to pass through the aperture.

* * * * *

UNITED STATES PATENT OFFICE
CERTIFICATE OF CORRECTION

Patent No. 3,895,930   Dated July 22, 1975

Inventor(s) Joseph Campolong

It is certified that error appears in the above-identified patent and that said Letters Patent are hereby corrected as shown below:

| | | |
|---|---|---|
| Column 2, line 30 | : | "provided" should be --prevented-- |
| Column 2, line 66 | : | "passing" should be --passage-- |
| Column 5, line 24 | : | "chamber" should be --change-- |
| Column 5, line 35 | : | "cyclonic does" should be --cyclonic flow does-- |
| Column 6, line 62 | | "chamber that" should be --chamber to ensure that-- |
| Column 7, line 23 | : | "120" should be --120°-- |
| Column 10, line 15 | : | "be" should be --by-- |
| Column 10, line 52 | : | "tubualr" should be --tubular-- |
| Column 12, line 1 | : | "whirling" should be --whirling air-- |

Signed and Sealed this

Twenty-seventh Day of July 1976

[SEAL]

Attest:

RUTH C. MASON
*Attesting Officer*

C. MARSHALL DANN
*Commissioner of Patents and Trademarks*